United States Patent
Overton et al.

(10) Patent No.: US 9,424,052 B2
(45) Date of Patent: Aug. 23, 2016

(54) REMOTELY EMULATING COMPUTING DEVICES

(75) Inventors: Adam J. Overton, Redmond, WA (US);
Bruce J. McKenzie, Murrieta, CA (US);
Ethan Z. Evans, Snoqualmie, WA (US);
Ian S. W. Cornwall, Seattle, WA (US);
Michael Anthony Frazzini, Seattle, WA (US); Paul A. Ryder, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1341 days.

(21) Appl. No.: 13/114,534

(22) Filed: May 24, 2011

(65) Prior Publication Data

US 2012/0245918 A1    Sep. 27, 2012

Related U.S. Application Data

(60) Provisional application No. 61/454,986, filed on Mar. 21, 2011.

(51) Int. Cl.
*G06F 9/455* (2006.01)
*G06F 9/44* (2006.01)

(52) U.S. Cl.
CPC .................... *G06F 9/4443* (2013.01)

(58) Field of Classification Search
USPC .......................................................... 703/27
See application file for complete search history.

(56) References Cited

U.S. PATENT DOCUMENTS

| | | |
|---|---|---|
| 6,937,972 B1 | 8/2005 | Van Ee |
| 7,319,948 B2 | 1/2008 | Levin et al. |
| 2003/0200290 A1 | 10/2003 | Zimmerman et al. |
| 2003/0225568 A1 * | 12/2003 | Salmonsen .......... H04L 12/283 703/27 |
| 2006/0059525 A1 | 3/2006 | Jerding et al. |
| 2009/0055157 A1 | 2/2009 | Soffer |
| 2009/0254778 A1 | 10/2009 | Huang et al. |
| 2009/0259481 A1 | 10/2009 | Dandekar et al. |
| 2010/0304860 A1 | 12/2010 | Gault et al. |
| 2011/0257958 A1 | 10/2011 | Kildevaeld |
| 2012/0242590 A1 | 9/2012 | Baccichet et al. |

FOREIGN PATENT DOCUMENTS

| | | |
|---|---|---|
| CN | 1625734 A | 6/2005 |
| CN | 1643569 A | 7/2005 |
| CN | 101675425 A | 3/2010 |

OTHER PUBLICATIONS

U.S. Appl. No. 12/885,296, filed Sep. 17, 2010 for "Accommodating Latency in a Service-Based Application".

(Continued)

*Primary Examiner* — Saif Alhija

(74) *Attorney, Agent, or Firm* — Thomas | Horstemeyer, LLP

(57) ABSTRACT

Disclosed are various embodiments that facilitate remote emulation of computing devices. A model of a computing device and an application that is executable in the computing device are identified. The application is executed in a hosted environment. A video signal of the application is encoded into a media stream. A user interface is encoded for rendering in a client. The user interface includes a graphical representation of the model of the computing device. A screen of the graphical representation of the model of the computing device is configured to render at least a portion of the video signal from the media stream.

25 Claims, 6 Drawing Sheets

(56) References Cited

OTHER PUBLICATIONS

U.S. Appl. No. 12/916,111, filed Oct. 29, 2010 for "Adding Latency to Improve Perceived Performance".
U.S. Appl. No. 12/940,132, filed Nov. 5, 2010 for "Providing Remote Access to Games Designed for a Single-Machine Experience".
U.S. Appl. No. 12/956,693, filed Nov. 30, 2010 for "Attention Misdirection for Streaming Video".
U.S. Appl. No. 12/957,450, filed Dec. 1, 2010 for "Altering Streaming Video Encoding Based on User Attention".
U.S. Appl. No. 12/964,225, filed Dec. 9, 2010 for "Enhancing User Experience by Presenting Past Application Usage".
U.S. Appl. No. 12/967,171, filed Dec. 14, 2010 for "Load Balancing Between General-Purpose Processors and Graphics Processors".
U.S. Appl. No. 12/968,845, filed Dec. 15, 2010 for "Sending Application Input Commands over a Network".
International Search Report and Written Opinion, dated Jun. 13, 2012 for PCT/US 12/29640.
Supplementary European Search Report for EP 12760826.3-1954 / 2689343 PCT/US2012029640 mailed Aug. 12, 2014.
Apple, iOS Development Guide, Tools & Languages: IDEs, Aug. 26, 2010, pp. 1-100.
Lemlouma, et al., "Context-Aware Adaptation for Mobile Devices," 2004 IEEE International Conference on Mobile Data Management, 6 pages.
Written Opinion for Singapore Application No. 2013063482 mailed Nov. 19, 2015.
Office Action for CN 201280010310.0 mailed Jul. 10, 2015.
English translation of Office Action for CN 201280010310.0 mailed Jul. 10, 2015.
English translation of the Abstract for CN 101675425 published on Mar. 17, 2010.
English translation of the Abstract for CN 1643569 published on Jul. 20, 2005.
English translation of the Abstract for CN 1625734 published on Jun. 8, 2005.
Canadian Office Action for CA 2,825,223 received Jun. 13, 2016.
Republic of China Office Action for 201280010310.0 issued Mar. 17, 2016. (Translation included).

* cited by examiner

REMOTELY EMULATING COMPUTING DEVICES

CROSS-REFERENCE TO RELATED APPLICATION

This application claims priority to, and the benefit of, U.S. Provisional Patent Application entitled, "REMOTELY EMULATING COMPUTING DEVICES," having Ser. No. 61/454,986, filed on Mar. 21, 2011, which is incorporated by reference in its entirety.

BACKGROUND

There are many specialized forms of computing devices such as, for example, smartphones, electronic book readers, tablet computers, video game consoles, and so on. Because of the physical differences among such devices, applications may differ from device to device. Even within a device category such as smartphones, different models of smartphones may have different display and input features.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to emulating computing devices over a network. Customers may wish to purchase applications for various computing devices over a network. In order to make an informed purchasing decision, a customer may wish to try the application before buying it. However, the customer may be using a different client device from the computing device that is intended to run the application. For example, the customer may be using a desktop computer and searching for applications for a mobile device such as a smartphone. Various embodiments of the present disclosure enable customers to use applications running remotely on emulated computing devices. Furthermore, in some embodiments, the customers may be able to buy the applications through an associated user interface. In the following discussion, a general description of the system and its components is provided, followed by a discussion of the operation of the same.

Various techniques related to executing applications remotely are described in U.S. Patent Application entitled "Providing Remote Access to Games Designed for a Single-Machine Experience" filed on Nov. 5, 2010 and assigned application Ser. No. 12/940,132, in U.S. Patent Application entitled "Enhancing User Experience by Presenting Past Application Usage" filed on Dec. 9, 2010 and assigned application Ser. No. 12/964,225, in U.S. Patent Application entitled "Sending Application Input Commands over a Network" filed on Dec. 15, 2010 and assigned application Ser. No. 12/968,845, in U.S. Patent Application entitled "Load Balancing Between General-Purpose Processors and Graphics Processors" filed on Dec. 14, 2010 and assigned application Ser. No. 12/967,171, in U.S. Patent Application entitled "Altering Streaming Video Encoding Based on User Attention" filed on Dec. 1, 2010 and assigned application Ser. No. 12/957,450, and in U.S. Patent Application entitled "Attention Misdirection for Streaming Video" filed on Nov. 30, 2010 and assigned application Ser. No. 12/956,693, all of which are incorporated herein by reference in their entirety.

Figure 1:
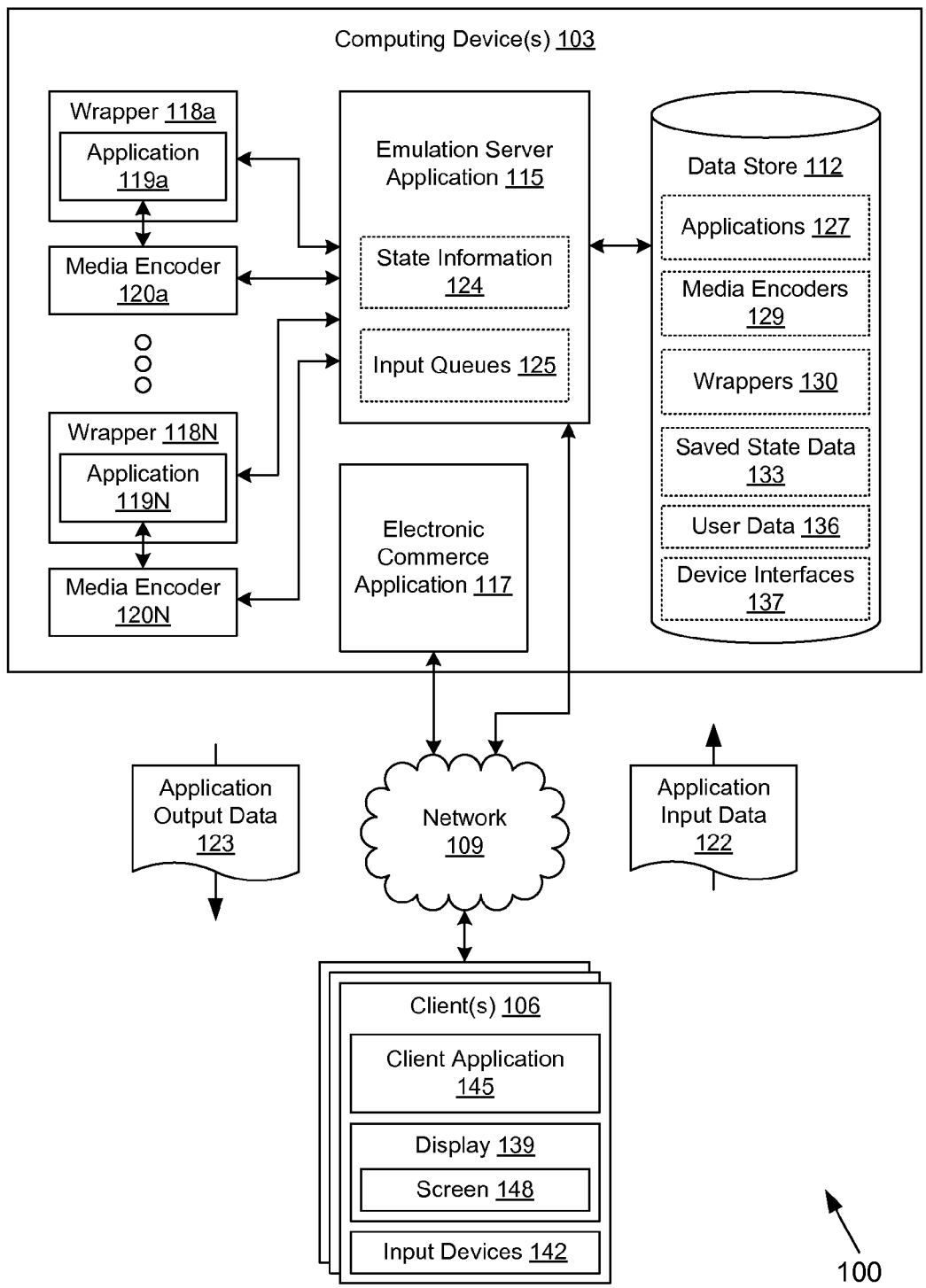
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores 112 as can be appreciated. The data stored in the data store 112, for example, is associated with the operation of the various applications and/or functional entities described below.

The components executed on the computing device 103, for example, include a emulation server application 115, an electronic commerce application 117, a plurality of wrappers 118a ... 118N, a plurality of applications 119a ... 119N, a plurality of media encoders 120a ... 120N, and other applications, services, processes, systems, engines, or functionality not discussed in detail herein. The emulation server application 115 may correspond to a type of application session server. The emulation server application 115 is executed to launch applications 119, which are executed within the wrappers 118. The emulation server application 115 is also executed to obtain application input data 122 from the clients 106 and provide the application input data 122 to the respective wrapper 118.

The emulation server application 115 is also executed to send application output data 123 that is captured from the application 119 to the clients 106. The emulation server application 115 may communicate with the client 106 over various protocols such as, for example, hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), transmission control protocol (TCP), and/or other protocols for communicating data over the network 109. The emulation server application 115 is configured to maintain state information 124 and input queues 125 associated with the executing applications 119.

In various embodiments, the emulation server application 115 may be configured to generate a user interface using one or more network pages. The network pages may include the streaming video and/or audio generated by the emulated application 119. In various embodiments, images of virtual input devices may be rendered in conjunction with the streaming video and/or audio. For example, a virtual keyboard for the emulated computing device may be included in the network page. Where the emulated computing device is a mobile computing device, an image of the mobile computing device may be included in the network page. The emulation server application 115 may facilitate interaction with the image of the mobile computing device in conjunction with the application 119. Where the emulated computing device corresponds to a mobile computing device with a screen, the video captured from the application 119 may be surrounded by the image of the mobile computing device, as if the video were shown on the screen of the mobile computing device.

The electronic commerce application 117 is executed in order to facilitate the online purchase of items, such as downloaded applications, from a merchant over the network 109. The electronic commerce application 117 also performs various backend functions associated with the online presence of a merchant in order to facilitate the online purchase of items. For example, the electronic commerce application 117 may generate network pages or portions thereof that are provided to clients 106 for the purposes of selecting items for purchase, rental, download, lease, or other forms of consumption. In some embodiments, the electronic commerce application 117 is associated with a network site that includes an electronic marketplace in which multiple merchants participate.

The application 119 may correspond, for example, to a game or other types of applications. As non-limiting examples, the application 119 may correspond to a first-person shooter game, an action game, an adventure game, a party game, a role-playing game, a simulation game, a strategy game, a vehicle simulation game, and/or other types of games. The application 119 may be originally designed for execution in a general-purpose computing device or in a specialized device such as, for example, a smartphone, a video game console, a handheld game device, an arcade game device, etc. The applications 119 may also correspond to mobile phone applications, computer-aided design (CAD) applications, computer-aided manufacturing (CAM) applications, photo manipulation applications, video editing applications, office productivity applications, operating systems and associated applications, emulators for operating systems, architectures, and capabilities not present on a consumer device, and other applications and combinations of applications.

The application 119 may expect to access one or more resources of the device on which it is executed. Such resources may correspond to display devices, input devices, or other devices. In some cases, the application 119 may request exclusive access to one or more of the resources, whereby no other applications may have access to the particular resources.

The wrapper 118 corresponds to an application that provides a hosted environment for execution of the application 119. In various embodiments, the wrapper 118 may be configured to provide a virtualized environment for the application 119 by virtualizing one or more of the resources that the application 119 expects to access. Such resources may include a keyboard, a mouse, a joystick, a video device, a sound device, a global positioning system (GPS) device, an accelerometer, a touchscreen, built-in buttons, a file system, a built-in battery, etc. In this way, the wrapper 118 is able to provide input commands and other data to the application 119 as if the wrapper 118 emulates a keyboard, a mouse, or another type of hardware device.

Further, the wrapper 118 is able to obtain a video signal and/or audio signal generated by the application 119 as if the wrapper 118 emulates a display device, an audio device, or another type of output device. Although many of the examples discussed herein relate to emulated computing devices with a display, emulated computing devices may also include, for example, set-top boxes, audio players, and/or other devices without an integrated display screen. The wrapper 118 is able to encode the video signal and/or audio signal by way of one or more media encoders 120 into a media stream. To this end, the wrapper 118 may include various types of media encoders 120, such as, for example, Moving Pictures Experts Group (MPEG) encoders, H.264 encoders, Flash® video encoders, etc. Such media encoders 120 may be selected according to factors such as, for example, data reduction, encoding quality, latency, etc. In some embodiments, the wrappers 118 may communicate directly with the clients 106 to obtain the application input data 122 and to serve up the application output data 123.

Different types of wrappers 118 may be provided for different applications 119 or classes of applications 119. As non-limiting examples, different wrappers 118 may be provided for applications 119 using different application programming interfaces (APIs) such as OpenGL®, DirectX®, the Graphics Device Interface (GDI), and so on. Where the application 119 is configured for execution in a specialized device or another type of computing device, the wrapper 118 may include an emulation application that emulates the device. In some embodiments, the output of the application 119 may be captured by the wrapper 118 at a device level. For example, the application 119 may be executed in a physical game console, and the video output may be captured by way of a video graphics array (VGA) connection, a high-definition multimedia interface (HDMI) connection, a component video connection, a national television system committee (NTSC) television connection, and/or other connections. In other embodiments, the output of the application 119 may be captured by the wrapper 118 by intercepting system calls, such as drawing calls under a graphics API or other system calls.

The state information 124 that is maintained by the emulation server application 115 includes various data relating to application sessions that are currently active. For example, the state information 124 may track the users that are currently participating in the application session, status information associated with the users, security permissions associated with the application session (e.g., who can or cannot join), and so on. In some embodiments, some or all of the state information 124 may be discarded when an application session ends. The input queues 125 collect input commands from the application input data 122 for a given application 119. The input commands may be reordered to a correct sequence and delays may be inserted between commands to ensure that they are interpreted correctly when presented to the corresponding application 119.

The data stored in the data store 112 includes, for example, applications 127, media encoders 129, wrappers 130, saved state data 133, user data 136, device interfaces 137, and potentially other data. The applications 127 correspond to a library of different applications that are available to be launched as applications 119. The applications 127 may correspond to executable code within the computing device 103. Alternatively, the applications 127 may correspond to code that is executable within another type of device but is not executable within the computing device 103. Such applications 127 may be referred to as "binaries," read-only memory images (ROMs), and other terms. A particular application 127 may be executed as multiple instances of the applications 119 for multiple application sessions.

The media encoders 129 correspond to the various types of media encoders 120 that may be employed in the computing device 103. Some media encoders 129 may correspond to specific formats, such as, for example, H.264, MPEG-4, MPEG-2, and/or other formats. The wrappers 130 correspond to the executable code that implements the various types of wrappers 118. The wrappers 130 are executable in the computing device 103 and may be executed as multiple instances of the wrappers 118 for multiple application sessions.

The saved state data 133 corresponds to game states that have been saved by the applications 119. Because the applications 119 may be executed in a virtualized environment, the applications 119 may write state information to a virtual location, which is then mapped for storage in the data store 112 as the saved state data 133. The saved state data 133 may correspond to data saved normally by the application 119 or may correspond to a memory image of the application 119 that may be resumed at any time. The user data 136 includes various data related to the users of the applications 119, such as, for example, types of computing devices associated with a user, security credentials, application preferences, billing information, a listing of other users that are permitted to join application sessions started by the user, and so on.

The device interfaces 137 correspond to images, animations, code, hypertext markup language (HTML), extensible markup language (XML), cascading style sheets (CSS), and/or other data that may be used to generate a graphical representation of a virtualized computing device. It is noted that an application 119 that is executable on a particular computing device platform may be associated with a multitude of device interfaces 137. As a non-limiting example, the Android® platform for smartphones may be supported by a multitude of different models of smartphones. Some of the models may have mini-keyboards with a touchscreen, while others may have merely a touchscreen with no physical mini-keyboard. The models may have different controls and casings. Therefore, different device interfaces 137 may be provided for different models of Android® smartphones.

In some embodiments, multiple different device interfaces 137 may be used in conjunction with one wrapper 130. Where the emulated computing device does not include an integrated display, the device interface 137 may include a representation of an external display device showing video generated by the emulated computing device. Similarly, other non-integrated external devices that may connect to the emulated computing device (e.g., keyboards, mice, etc.) may be represented by the device interface 137.

The client 106 is representative of a plurality of client devices that may be coupled to the network 109. The clients 106 may be geographically diverse. The client 106 may comprise, for example, a processor-based system such as a computer system. Such a computer system may be embodied in the form of a desktop computer, a laptop computer, personal digital assistants, cellular telephones, smartphones, set-top boxes, televisions that execute applications and can access the network 109, music players, web pads, tablet computer systems, game consoles, electronic book readers, or other devices with like capability.

The client 106 may include a display 139. The display 139 may comprise, for example, one or more devices such as cathode ray tubes (CRTs), liquid crystal display (LCD) screens, gas plasma-based flat panel displays, LCD projectors, or other types of display devices, etc. The client 106 may include one or more input devices 142. The input devices 142 may comprise, for example, devices such as keyboards, mice, joysticks, accelerometers, light guns, game controllers, touch pads, touch sticks, push buttons, optical sensors, microphones, webcams, and/or any other devices that can provide user input. Additionally, various input devices 142 may incorporate haptic technologies in order to provide feedback to the user.

The client 106 may be configured to execute various applications such as a client application 145 and/or other applications. The client application 145 is executed to allow a user to launch, join, play, or otherwise interact with an application 119 executed in the computing device 103. To this end, the client application 145 is configured to capture input commands provided by the user through one or more of the input devices 142 and send this input over the network 109 to the computing device 103 as application input data 122. The application input data 122 may also incorporate other data (e.g., GPS data, audio data, etc.) generated by the client 106 for use by the application 119. In various embodiments, the client application 145 corresponds to a browser application.

The client application 145 is also configured to obtain application output data 123 over the network 109 from the computing device 103 and render a screen 148 on the display 139. To this end, the client application 145 may include one or more video and audio players to play out a media stream generated by an application 119. In one embodiment, the client application 145 comprises a plug-in or other client-side code executed within a browser application. The client 106 may be configured to execute applications beyond the client application 145 such as, for example, browser applications, email applications, instant message applications, and/or other applications. In some embodiments, multiple clients 106 may be employed for one or more users to interact with the application 119. As non-limiting examples, some clients 106 may be specialized in display output, while other clients 106 may be specialized in obtaining user input. It is noted that different clients 106 may be associated with different latency requirements which may affect a delay employed before providing input commands to the application 119.

Figure 2A:
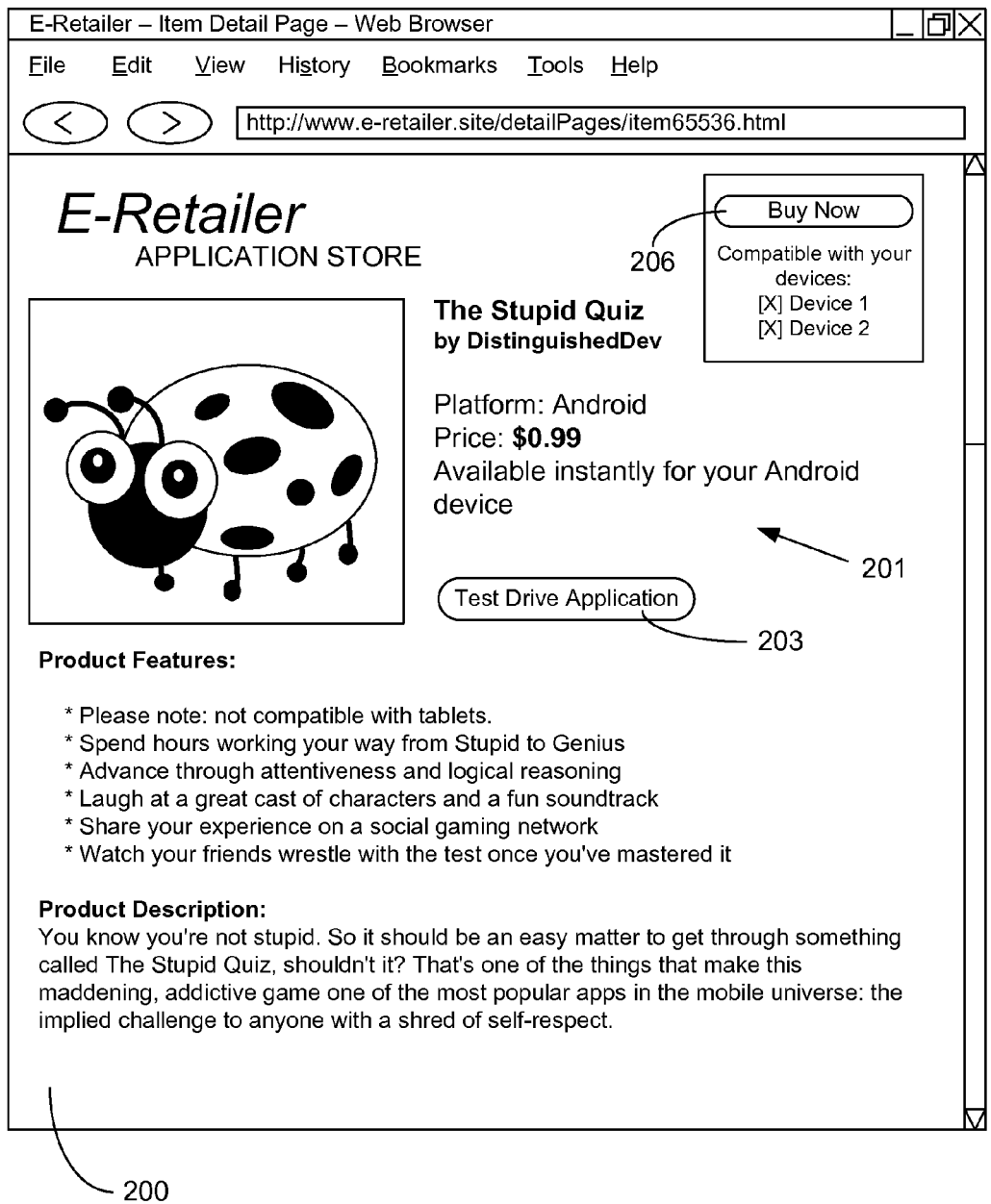
FIGS. 2A and 2B are examples of user interfaces rendered in a client in the networked environment of FIG. 1 according to various embodiments of the present disclosure.

Turning now to FIG. 2A, shown is one example of a user interface 200 rendered in a client application 145 (FIG. 1) executed in a client 106 (FIG. 1) in the networked environment 100 (FIG. 1). The user interface 200 shown in FIG. 2A corresponds to a network page generated by the electronic commerce application 117 (FIG. 1). The network page corresponds to a detail network page for an application 127 (FIG. 1) that is available for download through the electronic commerce application 117. The user interface 200 includes a description 201 of the application 127, which, in this example, is titled "The Stupid Quiz" and is priced at $0.99. The application 127 is available for download for Android® devices. Various screenshots and other descriptive information may be provided in the user interface 200. The user interface 200 may also include links to similar items.

An emulation request tool 203 is provided for a customer to launch a session of the application 127 through the emulation server application 115 (FIG. 1). In this case, when a customer activates the emulation request tool 203, the customer is able to use the application 127 in a virtualized environment that resembles the computing device on which it is intended to execute. Activating the emulation request tool 203 may cause a new network page to be loaded and/or a frame, lightbox, or other component within the user interface 200. A purchase component 206 may be provided for purchasing the application 127 for use on a particular computing device. In this non-limiting example, the customer is associated with two computing devices that are compatible with the application 127: "Device 1" and "Device 2." In other examples, incompatible devices associated with the customer may be listed as incompatible. The application 127 may also be added to a shopping cart, wish list, gift registry, or any other type of list of items.

Figure 2B:
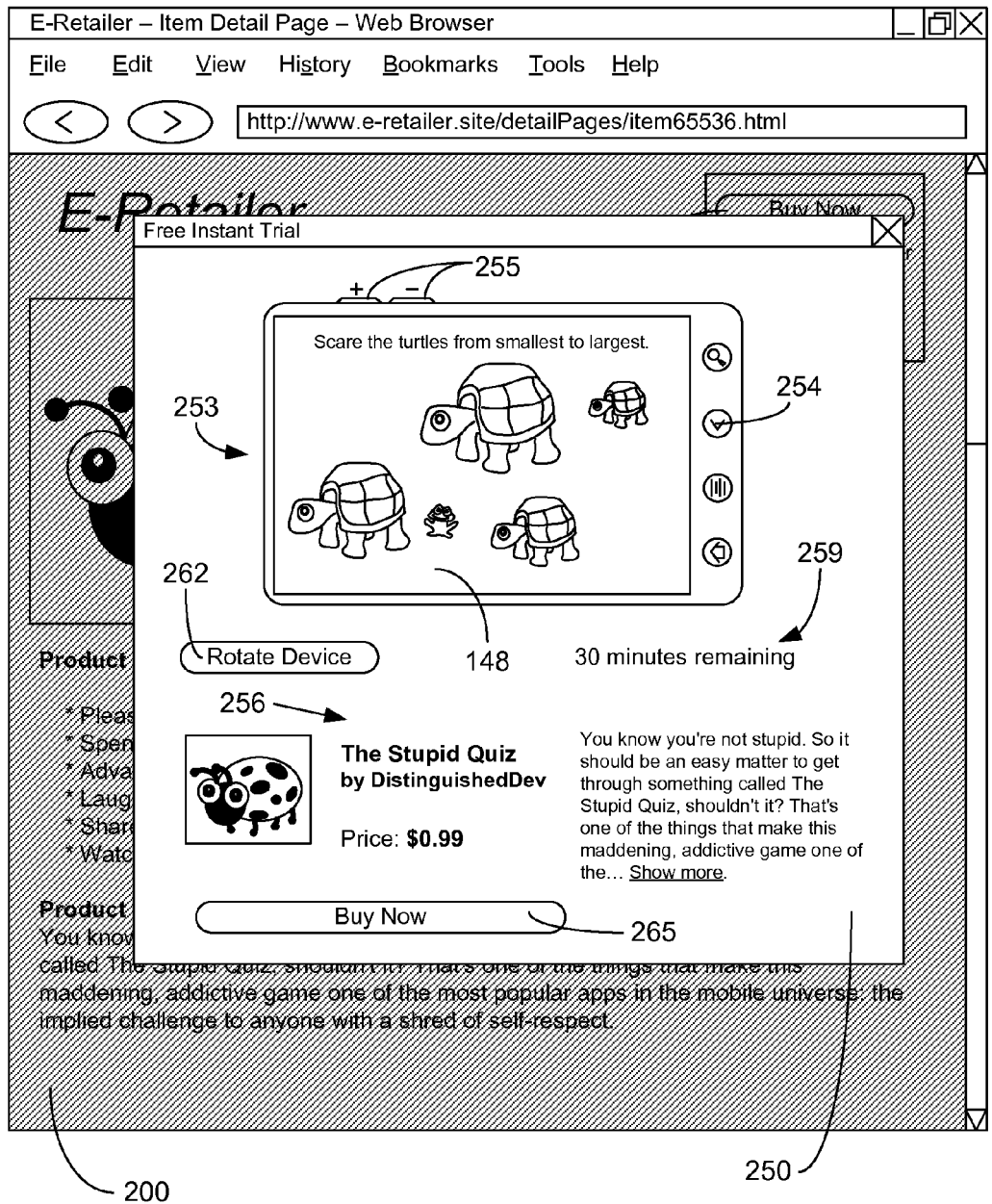

Continuing on to FIG. 2B, shown is another example of a user interface 200 rendered in a client application 145 (FIG. 1) executed in a client 106 (FIG. 1) in the networked environment 100 (FIG. 1). The user interface 200 shown in FIG. 2B corresponds to a network page generated by the electronic commerce application 117 (FIG. 1) as in FIG. 2A but overlaid with a user interface 250 that is a lightbox. In other examples, the user interface 250 may be presented in a full-screen format or another format. Portions of the user interface 250 may be generated by the electronic commerce application 117, while other portions of the user interface 250 may be generated by the emulation server application 115 (FIG. 1).

The user interface 250 includes a device interface 253 that is a graphical representation of an emulated computing device, which is in this case a particular model of an Android® smartphone. In some examples, the device interface 253 may correspond to a generic version of the emulated computing device, e.g., a generic version of an Android® smartphone. Which model is used may be specified by the customer in the user interface 200 or the user interface 250. In addition, a preference for a model of the emulated computing device may be stored in the user data 136.

The device interface 253 is generated by the emulation server application 115 from the applicable device interface 137 (FIG. 1). The device interface 253 includes virtual versions of input buttons 254 and/or other controls that are present in the actual device. Animations and/or images may be used to translate the physical experience into a virtual experience. Within the device interface 253 is a screen 148 (FIG. 1) that corresponds to the video portion of a media stream captured by the wrapper 118 (FIG. 1) from an application 119 (FIG. 1) that corresponds to the selected application 127 (FIG. 1). An audio portion of the media stream may be played out by the client application 145 in conjunction with the video portion of the media stream. Audio hardware controls 255 may be provided to control the audio playback from the emulated computing device, e.g., increasing or decreasing the volume of the audio. In other examples, other hardware controls may be provided, e.g., record, fast forward, rewind, stop, previous track, next track, screen brightness, selected display device, etc.

The user interface 250 may also include descriptive information 256 that may be an abbreviated version of the description 201 (FIG. 2A) in the user interface 200. The descriptive information 256 may include title, publisher, price, narrative description, and/or other information about the application 127. In this non-limiting example, the user interface 250 includes a timer 259 because the time spent testing the application 127 for possible purchase is limited. In other examples, the time for use of the application 127 by the customer may be unlimited.

The user interface 250 may include an orientation control 262 to rotate the orientation of the screen 148. Activating such an orientation control 262 may cause a virtualized version of an accelerometer or other device to inform the application 119 that the orientation of the emulated computing device has been changed, e.g., from portrait to landscape and vice versa. The user interface 250 may also include one or more purchase components 265 for initiating a purchase of the application 127 or adding the application 127 to a shopping cart, wish list, gift registry, or other list of items as can be appreciated.

Next, with reference to FIGS. 1, 2A, and 2B, a general description of the operation of the various components of the networked environment 100 is provided. To begin, a customer at a client 106 browses a network site served up by the electronic commerce application 117. The customer may, for example, navigate a catalog taxonomy, execute a search query, select links, and/or perform other navigational functions. The customer may arrive at a detail network page such as that shown in the user interface 200 of FIG. 2A or another similar network page that features an application 127 for download. The customer may specify one or more preferred models of an emulated computing device for which the customer is seeking applications 127.

In addition to purchasing and/or downloading the application 127, the customer may be given an opportunity to use the application 127 through a simulated interface. To this end, the customer at the client 106 sends a request to launch an application 119 to the emulation server application 115, for example, by activating the emulation request tool 203. The emulation server application 115 obtains the corresponding application 127, media encoder 129, wrapper 130, and device interface 137 from the data store 112. The emulation server application 115 then launches the application 119 in the corresponding wrapper 118. The emulation server application 115 tracks the status of the application 119 within the state information 124.

The wrapper 118 provides a hosted environment for execution of the application 119. In some embodiments, the hosted environment may include a virtualized environment for the application 119 that virtualizes one or more resources of the computing device 103. Such resources may include exclusive resources, i.e., resources for which the application 119 requests exclusive access. For example, the application 119 may request full screen access from a video device, which is an exclusive resource because normally only one application can have full screen access. Furthermore, the wrapper 118 may virtualize input devices such as, for example, keyboards, mice, GPS devices, accelerometers, etc. which may not actually be present in the computing device 103. The wrapper 118 may also provide access to a virtual file system to the application 119. In various embodiments, the wrapper 118 may correspond to a virtual machine and/or the wrapper 118 may be executed within a virtual machine.

The user at the client 106 enters input commands for the application 119 by use of the input devices 142 of the client 106. As a non-limiting example, the user may depress a left mouse button. Accordingly, the client application 145 functions to encode the input command into a format that may be transmitted over the network 109 within the application input data 122. The emulation server application 115 receives the input command, adds it to the input queue 125 for the application 119, and ultimately passes it to the wrapper 118. The wrapper 118 then provides a left mouse button depression to the application 119 by way of a virtualized mouse.

It is noted that variable latency characteristics of the network 109 may cause some input commands to be misinterpreted by the application 119 if the input commands are provided to the application 119 as soon as they are received. As a non-limiting example, two single clicks of a mouse button may be misinterpreted as a double click if the first single click is delayed by the network 109 by a greater amount than the second single click. Similarly, mouse clicks and mouse drags may be misinterpreted if the relative temporal relationship between certain input commands is not preserved.

As another non-limiting example, suppose that the application 119 corresponds to a game application within the fighting game genre, e.g., Mortal Kombat, Street Fighter, etc. The user at the client 106 may perform a series of complicated moves through a rapid sequence of input commands. If the input commands are subject to variable latency over the network 109, the series of moves may be misinterpreted by the application 119, thereby resulting in the character controlled by the user not performing the intended moves. For instance, two buttons may need to be pressed within a certain period of time to perform a punch move successfully. If the second input command is delayed by the network 109, but the first input command is not, the move may be unsuccessful without any fault of the user. To remedy this, the emulation server application 115 may delay the first input command to preserve the relative temporal relationship between the first and second input commands. In so doing, the gesture, or command sequence, performed by the user is preserved for the application 119.

Although the additional delay used may be predetermined, it may also be calculated based on the difference between the time period between the commands when generated in the client 106 and the time period between when the commands are received by the emulation server application 115. The time period between the commands when generated in the client 106 may be determined by referring to timestamps in metadata associated with the commands. It is noted that the various fixed latencies in the system (e.g., video encoding delay, minimum network latency) might not adversely impact the functionality of the application 119.

Various techniques related to adding latency and accommodating latency are described in U.S. Patent Application entitled "Adding Latency to Improve Perceived Performance" filed on Oct. 29, 2010 and assigned application Ser. No. 12/916,111, and in U.S. Patent Application entitled "Accommodating Latency in a Service-Based Application" filed on Sep. 17, 2010 and assigned application Ser. No. 12/885,296, both of which are incorporated herein by reference in their entirety.

In some cases, the delay in providing the input command to the application 119 may depend at least in part on a video frame region that is associated with the input command. As a non-limiting example, with an application 119 that is a game, it may be important to delay an input command relating to game play to preserve the meaning of the input command. However, the game screen 148 may also include a chat window, and the input command may be text to be sent to another player in the game by way of the chat window. If the input command relates to the chat window, the wrapper 118 may be configured to provide the input command to the application 119 without additional delay. That is, it may be preferable to send the text to the other user as soon as possible. Accordingly, the delay may depend on whether the input command is related to the region of the screen 148 that is the chat window. Also, it is understood that an application 119 may have multiple modes, where one mode is associated with a delay in providing input commands while another is not.

It may also be important to ensure that the input command is synchronized with the video frame presented to the user on the screen 148 when the user generated the input command in the client 106. As a non-limiting example, because of the various latencies of the system, a fireball intended to be thrown by the character controlled by the user in a fighting game may be thrown later than intended. In some cases, this may not matter. For example, the user may merely want to throw the fireball, and a short delay in throwing the fireball may be perfectly acceptable to the user. However, for more precision, the application 119 may support an API that allows the wrapper 118 to associate a frame number or other temporal identifier with an input command. Therefore, the application 119 can know precisely when the input command was performed and react accordingly. The frame number or other temporal identifier may be sent to the emulation server application 115 by the client application 145 as metadata for the input command.

In some embodiments, different input commands may be presented to the application 119 from those that were generated by a client 106. As a non-limiting example, if a user sends a mouse down command and the client application 145 loses focus, the wrapper 118 may be configured to send a mouse down command followed by a mouse up command. In various embodiments, the input commands may be relayed to the wrapper 118 as soon as possible, or the input commands may be queued by the wrapper 118 in the input queue 125 and relayed to the application 119 sequentially from the queue according to another approach.

Meanwhile, the graphical output of the application 119 is captured by the wrapper 118 and encoded into a media stream. Additionally, the audio output of the application 119 may be captured and multiplexed into the media stream. The graphical output and/or audio output of the application 119 may be captured by hardware devices of the computing device 103 in some embodiments. The media stream is transmitted by the emulation server application 115 to the client 106 over the network 109 as the application output data 123. The client application 145 obtains the application output data 123 and renders a screen 148 on the display 139 in a user interface 250. The screen 148 may be surrounded by a device interface 253 generated from the corresponding device interface 137 that facilitates input and output for the emulated computing device.

In some embodiments, a customer may start an application 119 at one client 106 and continue the application 119 at another client 106. Furthermore, multiple users at diverse locations may participate in an application 119. As a non-limiting example, an application 119 may have been developed to be executed in one device with multiple controllers. Accordingly, the wrapper 118 may be configured to map input commands from one client 106 to a first virtual controller and input commands from another client 106 to a second virtual controller. As another non-limiting example, an application 119 may have been developed to be executed in one device, where one side of the keyboard controls the first player and the other side of the keyboard controls the second player. Accordingly, the wrapper 118 may be configured to map input commands from one client 106 to keys on one side of a virtual keyboard and input commands from another client 106 to keys on another side of the virtual keyboard.

Various embodiments enable input generated through one type of input device 142 in a client 106 to be transformed by the wrapper 118 into input commands provided to the application 119 through an entirely different type of virtual input device. As a non-limiting example, input generated by an accelerometer in the client 106 may be translated by the wrapper 118 into input provided through a virtual mouse. Thus, completely different kinds of input devices 142 may be used in the application 119 that may not have been contemplated when the application 119 was implemented.

Where the input devices 142 incorporate haptic technologies and devices, force feedback may be provided to the input devices 142 within the application output data 123. As a non-limiting example, a simulated automobile steering wheel may be programmed by force feedback to give the user a feel of the road. As a user makes a turn or accelerates, the steering wheel may resist the turn or slip out of control. As another non-limiting example, the temperature of the input device 142 may be configured to change according to force feedback. In one embodiment, force feedback generated from the application input data 122 of one client 106 may be included in the application output data 123 sent to another client 106.

Because the client 106 is decoupled from the hardware requirements of the application 119, the application 119 may be used remotely through a diverse variety of clients 106 that are capable of streaming video with acceptable bandwidth and latency over a network 109. For example, a game application 119 may be played on a client 106 that is a smartphone. Thus, the client 106 need not include expensive graphics hardware to perform the complex three-dimensional rendering that may be necessary to execute the application 119. By contrast, the hardware of the computing device 103 may be upgraded as needed to meet the hardware requirements of the latest and most computationally intensive applications 119. In various embodiments, the video signal in the media stream sent by the emulation server application 115 may be scaled according to the bitrate and/or other characteristics of the connection between the computing device 103 and the client 106 over the network 109.

Having thoroughly tested the application 127 with an interface that resembles their own computing device, customers are well prepared to purchase the application 127. At any time, the customer may choose to purchase, lease, and/or download the application 127 by selecting various purchase components 206, 265. Additionally, if a customer does not own the particular version of the emulated computing device, the customer may decide to purchase a physical version of the emulated computing device after interacting with the virtual version.

Figure 3:
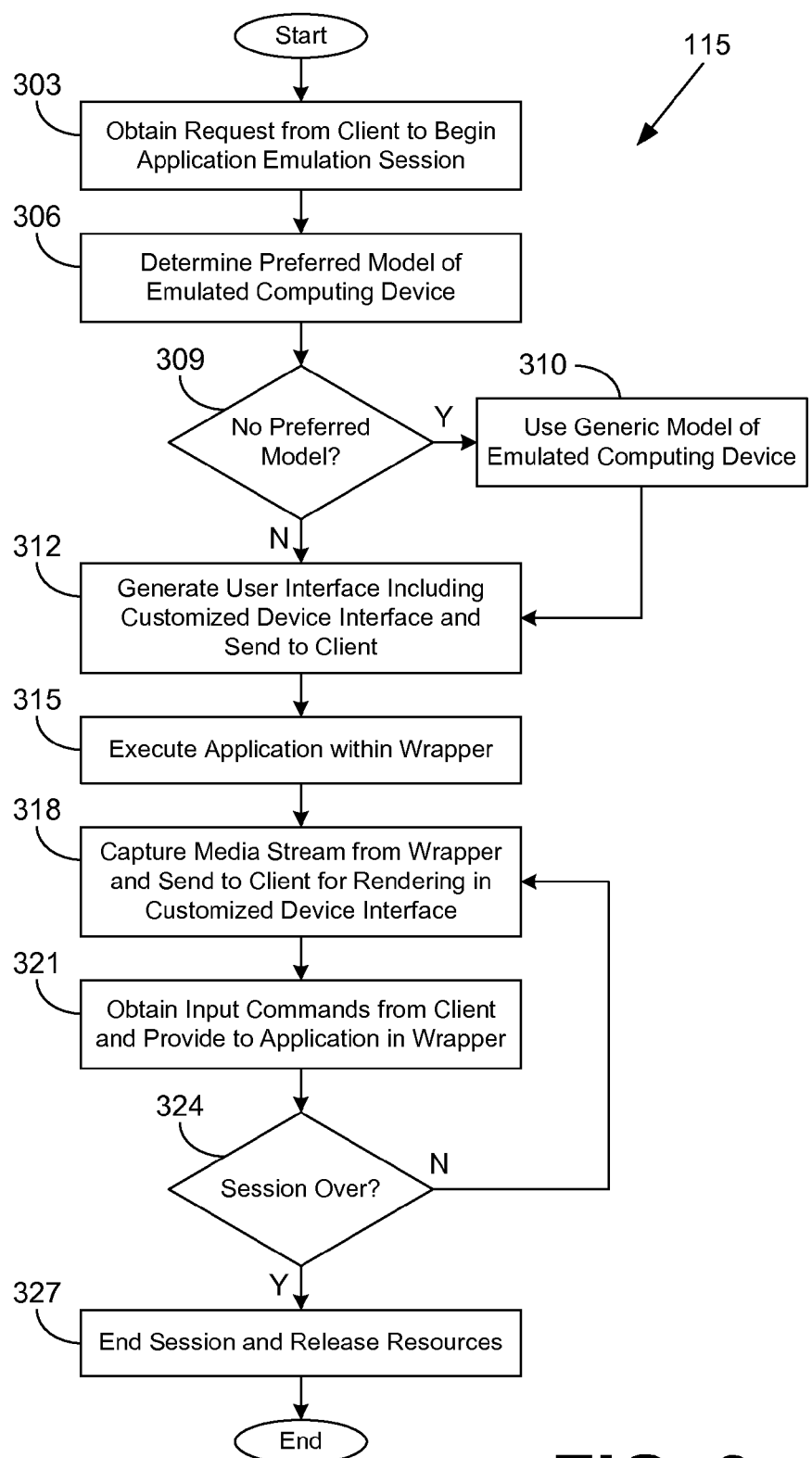
FIG. 3 is a flowchart illustrating one example of functionality implemented as portions of an emulation server application executed in a computing device in the networked environment of FIG. 1 according to various embodiments of the present disclosure.

Referring next to FIG. 3, shown is a flowchart that provides one example of the operation of a portion of the emulation server application 115 according to various embodiments. It is understood that the flowchart of FIG. 3 provides merely an example of the many different types of functional arrangements that may be employed to implement the operation of the portion of the emulation server application 115 as described herein. As an alternative, the flowchart of FIG. 3 may be viewed as depicting an example of steps of a method implemented in the computing device 103 (FIG. 1) according to one or more embodiments.

Beginning with box 303, the emulation server application 115 obtains a request from a client 106 (FIG. 1) to begin an application emulation session for a particular application 127 (FIG. 1). In box 306, the emulation server application 115 determines a preferred model of the emulated computing device either specified by the customer at the client 106 or otherwise associated with the customer. In box 309, the emulation server application 115 determines whether there is no preferred model indicated. If there is no preferred model indicated, or if a device interface 137 (FIG. 1) for the preferred model is unavailable, the emulation server application 115 moves to box 310 and uses a generic model of the emulated computing device for executing the application 127 and providing a device interface 253 (FIG. 2B). The emulation server application 115 then continues to box 312. If a preferred model is indicated, the emulation server application 115 also continues to box 312 and uses the preferred model.

In box 312, the emulation server application 115 generates the user interface 250 (FIG. 2B) that includes a customized device interface 253 and sends the corresponding data to the client 106. In box 315, the emulation server application 115 loads the application 127 and executes an instance of an application 119 (FIG. 1) within a wrapper 118 (FIG. 1) that corresponds to the emulated computing device. In box 318, the emulation server application 115 captures the media stream from the wrapper 118, which may be encoded by the media encoder 120 (FIG. 1) and/or other encoders. The emulation server application 115 sends the media stream to the client 106 as application output data 123 (FIG. 1) for rendering in the customized device interface 253. In some embodiments, the device interface 253 may be embedded into the video signal of the media stream.

In box 321, the emulation server application 115 obtains input commands from the client 106 in application input data 122 (FIG. 1). The emulation server application 115 provides the input commands to the application 119 executing in the wrapper 118. In box 324, the emulation server application 115 determines whether the session is over. As a non-limiting example, the session may be associated with a timer, and the timer may have expired. As another non-limiting example, the session may have been explicitly ended through user interaction at the client 106. As yet another non-limiting example, the session may have been implicitly ended through user inaction at the client 106.

If the session is not over, the emulation server application 115 returns to box 318 and continues to capture the media stream from the application 119. If the session is over, the emulation server application 115 proceeds to box 327 and ends the session and releases resources consumed by the session. Thereafter, the portion of the emulation server application 115 ends.

Figure 4:
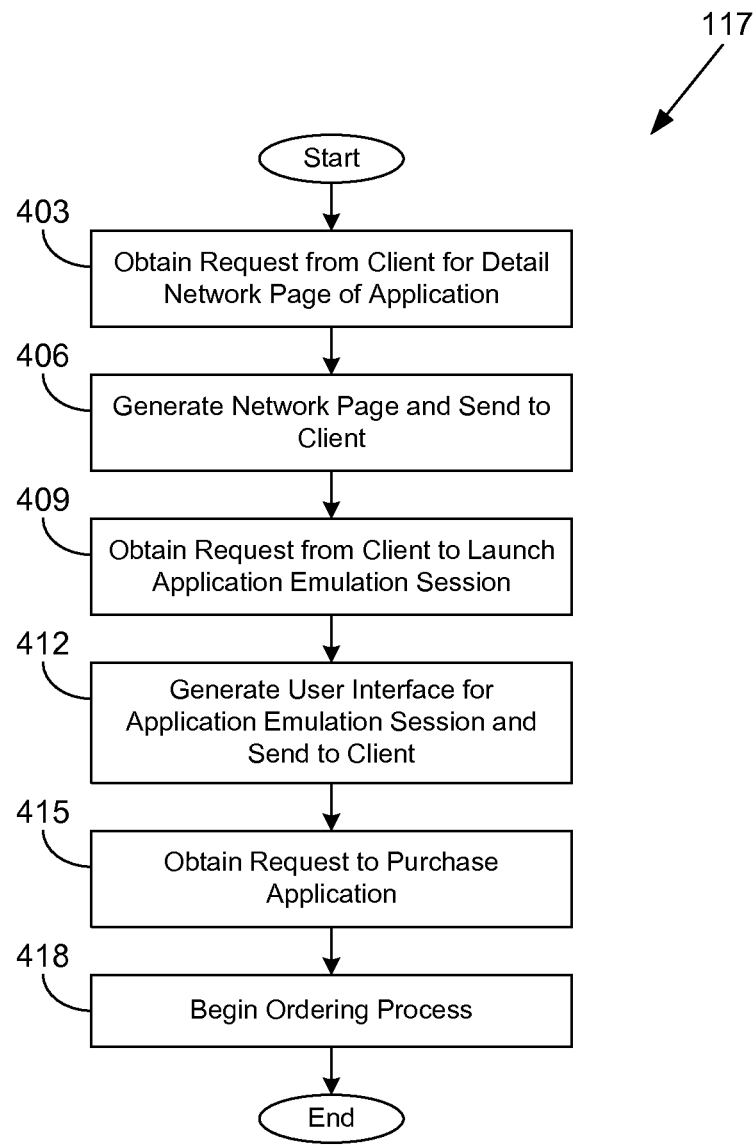
FIG. 4 is a flowchart illustrating one example of functionality implemented as portions of an electronic commerce application executed in a computing device in the networked environment of FIG. 1 according to various embodiments of the present disclosure.

Moving on to FIG. 4, shown is a flowchart that provides one example of the operation of a portion of the electronic commerce application 117 according to various embodiments. It is understood that the flowchart of FIG. 4 provides merely an example of the many different types of functional arrangements that may be employed to implement the operation of the portion of the electronic commerce application 117 as described herein. As an alternative, the flowchart of FIG. 4 may be viewed as depicting an example of steps of a method implemented in the computing device 103 (FIG. 1) according to one or more embodiments.

Beginning with box 403, the electronic commerce application 117 obtains a request from a client 106 (FIG. 1) for a detail network page regarding an application 127 (FIG. 1). In box 406, the electronic commerce application 117 generates the network page and sends the network page to the client 106. In box 409, the electronic commerce application 117 obtains a request from the client 106 to launch an application emulation session. In box 412, the electronic commerce application 117 generates a user interface 250 (FIG. 2B) or a portion of the user interface 250 for the application emulation session in conjunction with the emulation server application 115 and sends the corresponding data to the client 106 for rendering on a display 139 (FIG. 1).

In box 415, the electronic commerce application 117 obtains a request to purchase the application 127. In box 418, the electronic commerce application 117 begins an ordering process to complete the order for the application 127 by the customer, which may involve various tasks in an order pipeline. Thereafter, the portion of the electronic commerce application 117 ends.

Figure 5:
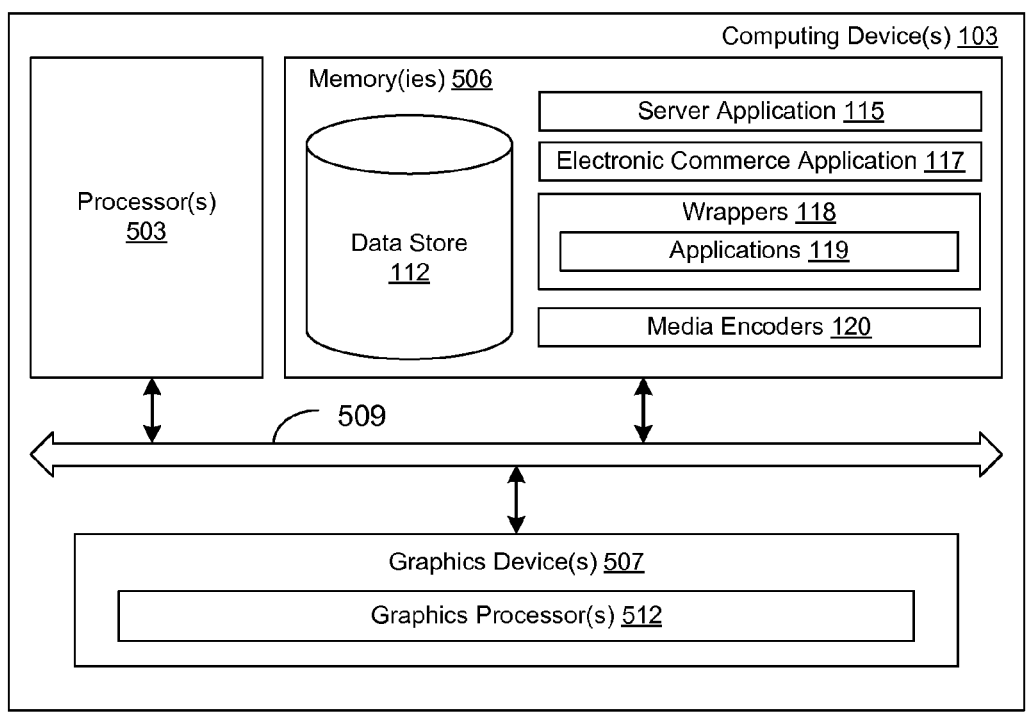
FIG. 5 is a schematic block diagram that provides one example illustration of a computing device employed in the networked environment of FIG. 1 according to various embodiments of the present disclosure.

With reference to FIG. 5, shown is a schematic block diagram of the computing device 103 according to an embodiment of the present disclosure. The computing device 103 includes at least one processor circuit, for example, having a processor 503, a memory 506, and, optionally, one or more graphics devices 507, all of which are coupled to a local interface 509. To this end, the computing device 103 may comprise, for example, at least one server computer or like device. The local interface 509 may comprise, for example, a data bus with an accompanying address/control bus or other bus structure as can be appreciated. The graphics devices 507 may correspond to high-performance graphics hardware, including one or more graphics processors 512. The graphics devices 507 are configured to render graphics corresponding to the applications 119 executed in the computing device 103.

Stored in the memory 506 are both data and several components that are executable by the processor 503. In particular, stored in the memory 506 and executable by the processor 503 are the emulation server application 115, the electronic commerce application 117, the wrappers 118, the applications 119, the media encoders 120, and potentially other applications. Also stored in the memory 506 may be a data store 112 and other data. In addition, an operating system may be stored in the memory 506 and executable by the processor 503.

It is understood that there may be other applications that are stored in the memory 506 and are executable by the processors 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and the memory 506 may represent multiple memories 506 that operate in parallel processing circuits, respectively. In such a case, the local interface 509 may be an appropriate network 109 (FIG. 1) that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the emulation server application 115, electronic commerce application 117, the wrappers 118, the applications 119, the media encoders 120, the client application 145 (FIG. 1), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3 and 4 show the functionality and operation of an implementation of portions of the electronic commerce application 117 and the emulation server application 115. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 3 and 4 show a specific order of execution, it is understood that the order of execution may differ from that which is depicted. For example, the order of execution of two or more blocks may be scrambled relative to the order shown. Also, two or more blocks shown in succession in FIGS. 3 and 4 may be executed concurrently or with partial concurrence. Further, in some embodiments, one or more of the blocks shown in FIGS. 3 and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the emulation server application 115, the electronic commerce application 117, the wrappers 118, the applications 119, the media encoders 120, and the client application 145, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, wherein when executed the program cause the computing device to at least:
   determine one of a plurality of models of an emulated computing device;
   obtain a selection of an application that is executable in the emulated computing device from a client;
   execute the application in a hosted environment;
   encode a video signal and an audio signal generated by the application into a media stream;
   generate a user interface that includes a graphical representation of a physical interface of the one of the models of the emulated computing device;
   generate a rendering of the video signal from the media stream on a graphical representation of a physical screen of the one of the models of the emulated computing device;
   sends the user interface and the media stream to the client;
   obtain an input command from the client, the input command being generated through a user interaction with the graphical representation of the physical interface of the one of the models of the emulated computing device; and
   provide the input command to the application executing in the hosted environment.

2. The non-transitory computer-readable medium of claim 1, wherein the emulated computing device is a mobile computing device.

3. A system, comprising:
   at least one computing device; and
   a server application executable in the at least one computing device, wherein when executed the server application causes the at least one computing device to at least:
      identify a model of a computing device and an application that is executable in the computing device;
      execute the application in a hosted environment and encode a video signal of the application into a media stream;
      generate a user interface for rendering in a client, the user interface including a graphical representation of a physical interface of the model of the computing device; and
      generate a rendering of at least a portion of the video signal from the media stream on a graphical representation of a physical screen of the graphical representation of the physical interface of the model of the computing device.

4. The system of claim 3, wherein the graphical representation of the physical interface of the model of the computing device includes a graphical representation of at least one input device associated with the model of the computing device.

5. The system of claim 3, wherein the computing device is a mobile computing device.

6. The system of claim 3, wherein when executed the server application further causes the at least one computing device to at least:
   send the user interface and the media stream to the client;
   obtain an input command from the client, wherein the user interface is further configured to generate the input command in response to a user interaction with a graphical representation of an input device; and
   provide the input command to the application through a virtualized input device.

7. The system of claim 3, wherein the model of the computing device is a generic model of the computing device.

8. The system of claim 3, wherein the user interface further comprises a component for initiating a purchase of the application.

9. The system of claim 3, wherein the user interface further comprises a component for adding the application to a list of items.

10. The system of claim 3, wherein the user interface further comprises a component for rotating the graphical representation of the physical interface of the model of the computing device.

11. The system of claim 3, wherein the video signal includes the graphical representation of the physical interface of the model of the computing device.

12. The system of claim 3, wherein when executed the server application further cause the at least one computing device to at least stop execution of the application upon expiration of a predefined time period.

13. The system of claim 6, wherein the input command is generated by a mouse device of the client.

14. The system of claim 3, wherein the application is not natively executable in the client.

15. The system of claim 3, wherein when executed the server application further causes the at least one computing device to at least encode an audio signal generated by the application into the media stream, wherein the user interface is configured to play out the audio signal in the client.

16. The system of claim 3, wherein the hosted environment comprises a virtualized environment that is configured to virtualize at least one input device, and input data obtained from the client are provided to the application through the at least one input device.

17. A method, comprising:
 obtaining, in a computing device, a user interface from a server, the user interface including a graphical representation of a physical interface of a mobile computing device;
 obtaining, in the computing device, a media stream from the server, the media stream including a video signal that is captured from an application executed in a virtualized environment that emulates the mobile computing device;
 rendering, in the computing device, the user interface; and
 rendering, in the computing device, the video signal from the media stream on a graphical representation of a physical screen of the mobile computing device.

18. The method of claim 17, further comprising:
 obtaining, in the computing device, user input relative to the graphical representation of the physical interface of the mobile computing device;
 generating, in the computing device, at least one input command in response to the user input; and
 sending, in the computing device, the at least one input command to the server.

19. The method of claim 18, wherein the user input is provided relative to a graphical representation of an input device of the mobile computing device.

20. The method of claim 17, further comprising:
 obtaining, in the computing device, a network page regarding the application; and
 sending, in the computing device, a request to launch an emulation session for the application to the server.

21. The method of claim 17, further comprising sending, in the computing device, a request to initiate a purchase of the application to the server.

22. A system, comprising:
 at least one computing device; and
 a server application executable in the at least one computing device, wherein when executed the server application causes the at least one computing device to at least:
  identify a model of a computing device and an application that is executable in the computing device;
  execute the application in a hosted environment and encode an output of the application into a media stream;
  generate a user interface for rendering in a client, the user interface including a graphical representation of a physical interface of the model of the computing device; and
  generate a rendering of a video signal on a graphical representation of a physical screen of the model of the computing device, wherein the graphical representation of the physical screen is updated in response to the output of the application in the media stream.

23. The system of claim 22, wherein the media stream includes data for updating the graphical representation of the physical screen.

24. The system of claim 22, wherein the graphical representation of the physical interface of the model of the computing device includes a graphical representation of at least one integrated input device of the model of the computing device.

25. The system of claim 22, wherein the graphical representation of the physical interface of the model of the computing device corresponds to a generic version of the model of the computing device.

* * * * *